Dec. 17, 1929.   I. C. BELL   1,739,537
PISTON RING
Filed Feb. 28, 1928
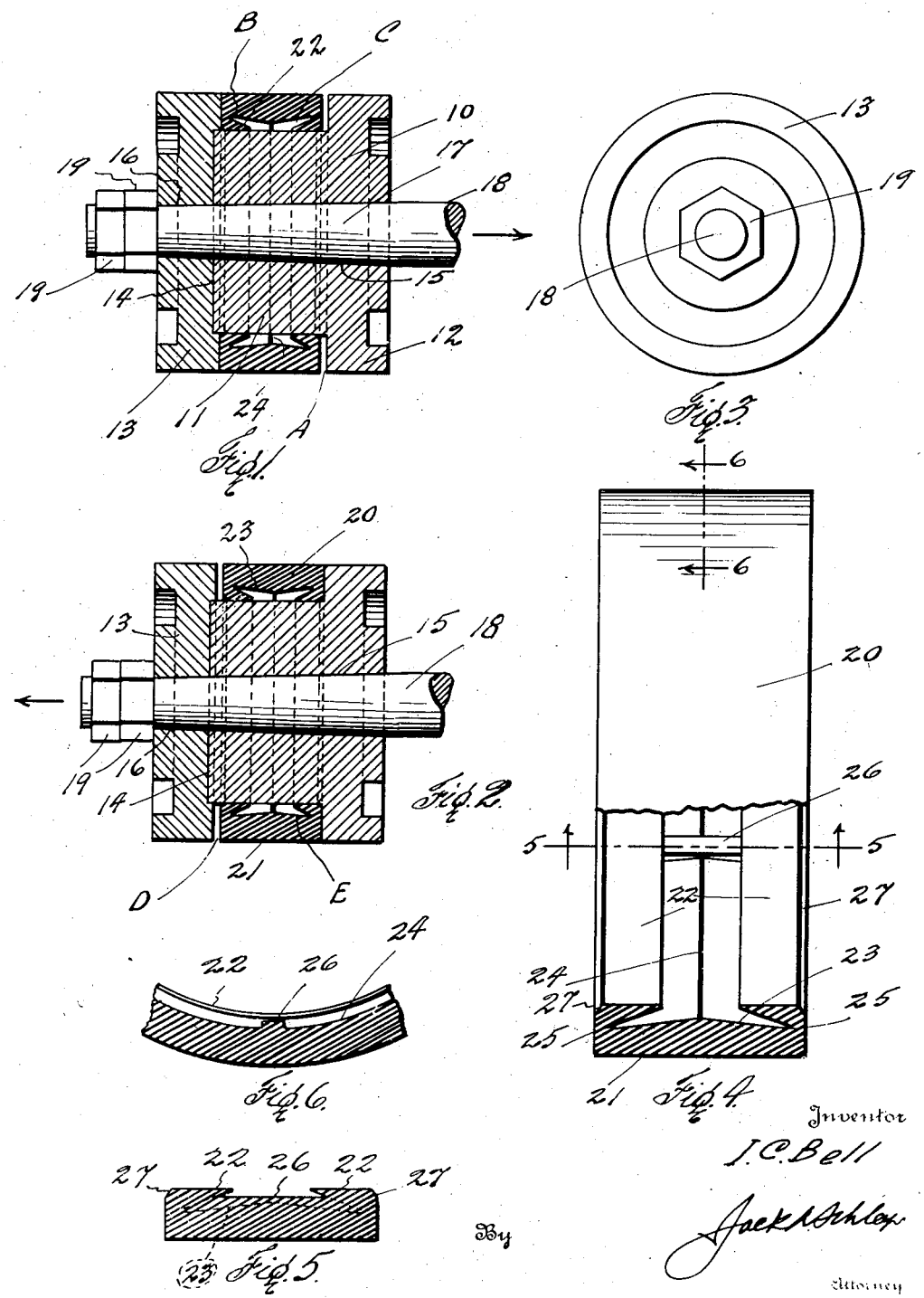
Inventor
I. C. Bell Patented Dec. 17, 1929

1,739,537

UNITED STATES PATENT OFFICE

IVAN C. BELL, OF DALLAS, TEXAS

PISTON RING

Application filed February 28, 1928. Serial No. 257,573.

This invention relates to new and useful improvements in piston rings.

One object of the invention is to provide a piston ring particularly adapted for pumps and similar work and so arranged as to be expanded by the fluid pressure when the piston is at work.

Another object of the invention is to provide a simple piston ring which may be applied to an ordinary piston and the fluid pressure utilized to expand said ring without the necessity of altering the piston or providing passages therein.

A still further object of the invention is to provide a piston ring provided with opposite interior annular sealing lips so arranged as to form a hydraulic seal with the piston upon reverse strokes of said piston.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a longitudinal sectional view of a piston equipped with a ring constructed in accordance with my invention, Fig. 2 is a similar view, showing the position of the parts upon a reverse stroke of the piston, Fig. 3 is an end elevation of the piston, Fig. 4 is a view of the piston ring partly in elevation and partly in section, Fig. 5 is a transverse sectional view taken on the line 5—5 of Fig. 4, and Fig. 6 is a sectional view taken on the line 6—6 of Fig. 4.

In the drawings the numeral 10 designates an ordinary piston head, which is provided with a reduced annular hub 11 and a flange 12 directed outwardly from one end of said hub. A follower 13 in the form of a disk or circular plate has a central countersunk seat 14 for receiving the outer end of the hub. The head 10 and follower 13 have tapered bores 15 and 16, respectively, for fitting on the tapered shank 17 of a piston rod 18, as is shown in Figs. 1 and 2. The parts are held in position on the shank 17 by nuts 19. The piston which has been described is of a type now in common use and has been shown merely as a means for illustrating the invention, as the particular type of piston forms no part of the invention.

In carrying out the invention, I provide an elastic or resilient ring 20 which may be formed of rubber, rubber compound, or any other suitable material. This ring is provided with a substantially smooth periphery or cylindrical outer surface 21 and encircles the hub 11. It is important that the transverse width or face of the ring be less than the width of the space between the flange 12 and the follower 13, as will be presently described.

A particular feature of the invention resides in a pair of transversely directed lips 22 directed toward each other and disposed annularly within the ring so as to embrace the hub 11. A pressure fluid channel 23 is formed between the lips circumferentially of the hub and the channel extends transversely and relatively under said lips. The bottom of the channel may be converged to a central annular ridge 24, whereby the ring is strengthened and inclined surfaces are provided which induce the fluid to flow into the pockets 25 formed under the lips 22. Transverse reinforcing ribs 26 may be cast in the channel, if desired.

When the piston is being pulled to the right, the parts will be in the position shown in Fig. 1. Such a movement will cause the ring 20 to slide on the hub 11 toward the follower 13, thus leaving a space A between the flange 12 and said ring. In practice this space may be very slight and only sufficient to permit the fluid which passes by the flange to also pass through said space and under the adjacent lip 22 to the channel 23. The fluid being under pressure, will enter the pocket B in Fig. 1 under the flange 22 and compress the lip 22 thereof about the hub 11, so as to form a seal. The pressure of the fluid in the channel 23 will also tend to expand the ring and cause it to seal against the surface of the pump cylinder. It will be seen that the fluid entering under the lip 22 on the right hand side of the ring will also enter the pocket C, but the pressure will be equalized on each side of the lip thereof.

When the plunger is pulled to the left, the ring 20 will shift to the position shown in Fig. 2, whereby a space D will be opened between said ring and the follower 13. The fluid will enter under the lip 22 adjacent said space and flow into the pocket E on the opposite side, thus sealing the lip 22 thereof against the hub 11. The ring will automatically seal itself during each stroke and will also prevent the fluid passing between the piston and the cylinder wall. The lips, of course, must be flexible enough to permit the operation and must not fit the head too tightly. If found desirable, the outer edges of the lips may be beveled at 27 and such bevels will aid the fluid in passing from the spaces A and D under said lips. The piston ring may be made in various sizes and may be applied to standard pistons without changing the construction of the same.

Various changes in the size and shape of the different parts, as well as modifications and alterations, may be made within the scope of the appended claims.

What I claim, is:

1. An elastic piston ring comprising internal annular compression lips and fluid pockets contiguous to said lips, said ring having an internal annular channel between and communicating with said lips and pockets and said lips overlying said pockets.

2. An elastic piston ring comprising internal annular transverse compression lips and an annular internal channel between said lips, the free edges of said lips overhanging said channel.

3. An elastic piston ring comprising internal annular compression lips and an annular internal channel between said lips, the free edges of said lips overhanging said channel, the outer annular edges of the bore of said ring being beveled.

4. An elastic piston ring comprising a circumferential body having an internal annular channel and annular pockets along each side of said channel, the bottom walls of the channel diverging into said pockets, and internal annular lips transversely overhanging said pockets circumferentially of the ring.

5. The combination with the groove of a piston head, of an elastic ring confined in said groove and of less width than said groove so as to slide relatively thereof and provide a fluid space at one side of said ring, said ring having internal annular lips for engaging in the bottom of said groove, whereby fluid under pressure admitted through the space at the side of said ring may by-pass one of said lips and compress the other lip to form a seal with the bottom of the groove.

6. The combination with the groove of a piston head, of an elastic ring confined in said groove and of less width than said groove so as to slide relatively thereof and provide a fluid space at one side of said ring, said ring having internal annular lips for engaging in the bottom of said groove, whereby fluid under pressure admitted through the space at the side of said ring may by-pass one of said lips and compress the other lip to form a seal with the bottom of the groove, said ring having a circumferential groove between said lips for receiving said pressure fluid, whereby said ring is expanded.

7. The combination with the groove of a piston head, of an elastic ring confined in said groove and of less width than said groove so as to slide relatively thereof and provide a fluid space at one side of said ring, said ring having internal annular lips for engaging in the bottom of said groove, whereby fluid under pressure admitted through the space at the side of said ring may by-pass one of said lips and compress the other lip to form a seal with the bottom of the groove, said ring being arranged to shift in said piston groove at each end of the stroke, whereby said space at the side of the ring is shifted to the other side of the ring and the fluid is caused to enter under the lip which was previously compressed.

In testimony whereof I affix my signature.

IVAN C. BELL.